J. F. REEDER.
ATTACHMENT FOR SPADES AND THE LIKE.
APPLICATION FILED JAN. 10, 1914.
1,098,460.
Patented June 2, 1914.
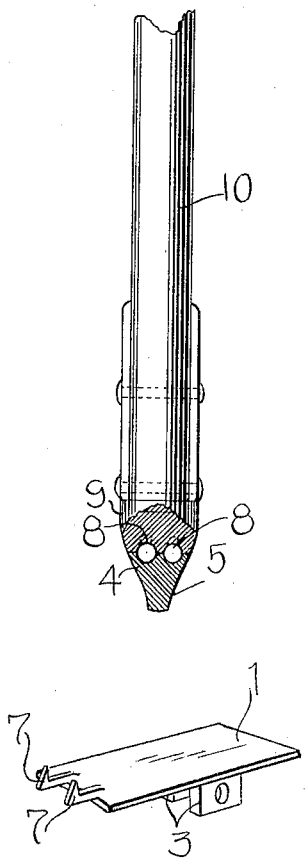
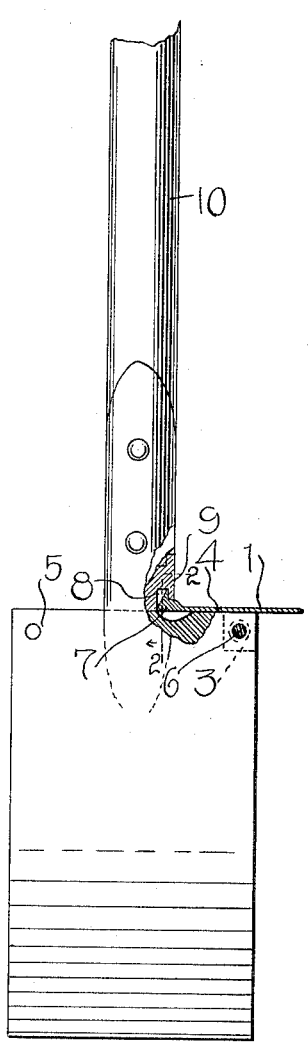
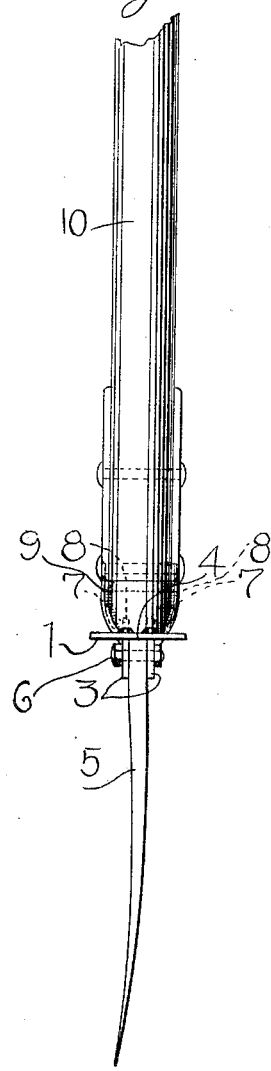
Witnesses
Robert M. Sutphen
A. L. Hinf
Inventor
J. F. Reeder
By Watson E. Coleman
Attorney

UNITED STATES PATENT OFFICE.

JOHN F. REEDER, OF SHELBYVILLE, ILLINOIS.

ATTACHMENT FOR SPADES AND THE LIKE.

1,098,460.  Specification of Letters Patent.  Patented June 2, 1914.

Application filed January 10, 1914. Serial No. 811,399.

*To all whom it may concern:*

Be it known that I, JOHN F. REEDER, a citizen of the United States, residing at Shelbyville, in the county of Shelby and State of Illinois, have invented certain new and useful Improvements in Attachments for Spades and the like, of which the following is a specification, reference being had to the accompanying drawings.

This invention comprehends certain new and useful improvements in attachments for spades and the like, and has for its primary object to provide a device of this character which may be readily secured in position to form a foot piece upon which the operator may place his foot to force the spade or other implement to which the attachment is secured into the ground.

As spades and the like are often very narrow, the operator's foot frequently slips off of the same, the shoe coming into engagement with the sharp upper corner of the implement and often tearing the shoe and injuring the foot of the operator, and it is an object of my invention to provide an attachment for the implement which will form an extension to this narrow upper edge of the implement and serve as a foot rest of sufficient size to receive the foot of the operator and eliminate danger of the foot sliding off during use of the implement, as just described.

A further object is to provide a device of this character which will be of extremely simple and cheap construction and which will be formed in such manner that it may be attached to either side of the implement and removably secured upon the upper edge of the same and which will be highly efficient and effective in use.

A still further object is to generally improve and simplify the construction of devices of this character and increase the efficiency thereof without materially increasing the cost of manufacture of the same.

With the above and other objects in view, my invention consists in certain novel constructions, combinations, and arrangement of parts to be hereinafter more fully described, claimed, and illustrated in the accompanying drawings, in which—

Figure 1 is a front elevational view, of an implement with my attachment applied thereto; Fig. 2 is a side elevational view, partly in section of the implement, showing the openings for the prongs of my attachment; Fig. 3 is a side elevational view of the complete implement with my attachment applied; and Fig. 4 is a detail perspective view of my invention detached.

Referring more specifically to the drawings in which similar reference characters designate corresponding parts throughout the several views, 1 designates the body of the device which has its opposite longitudinal edges 2 extended over the opposite edges of the implement proper 5. A pair of parallel depending ears 3 are secured by their upper edges to the under face of said body 1 and adapted to be engaged over the upper edge 4 of the implement proper 5, said ears being engaged upon opposite faces of said implement proper and provided with registering apertures through which is engaged a bolt 6 or other securing member, it being understood that a suitable aperture is also provided in the implement proper, adjacent the upper outer corner thereof and in alinement with the apertures in said ears, whereby said bolt may also be passed through the implement proper.

To secure the inner end of the body 1 against movement, I have provided a pair of upwardly directed hook members 7, formed upon the inner end of the body 1 and adapted to be engaged through the openings 8 in the metallic handle receiving member 9 carried by the implement proper 5. It will be understood that the openings 8 are provided in opposite sides of the handle receiving member 9 and that the bolt receiving apertures are provided at each upper corner of the implement proper, whereby the attachment may be secured in position to either side of the implement handle 10.

It will be understood that the inner end of the body 1 is slightly concaved, whereby said end may partly encircle the handle receiving member 9 when engaged therewith, thereby preventing rocking movement of the attachment. It will also be understood that the hook members 7 are formed by turning upwardly the short extension formed on the concaved inner end of the body 1, thereby making it possible to produce the complete device from a single blank of metal.

While I have shown the preferred embodiment of my invention, minor changes in the details of construction and arrangement of parts may be made within the scope of the appended claims without departing from the spirit of my invention or sacrificing any of the advantages of the same.

What I claim is:—

1. A device of the class described comprising the combination with an implement proper having bolt openings adjacent its upper corners and a handle receiving member carried by said implement and provided with openings above the sides of the implement, of a foot rest including a body adapted for engagement upon the upper edge of the implement, depending members carried by said body and adapted for engagement upon opposite sides of the implement, a bolt engaged through said depending members and through one of the bolt openings in the implement to secure the body in position, and hooks carried by said body and engaged in the openings in the handle receiving member above the edge of the implement upon which the body is engaged to prevent movement of said body.

2. A device of the class described comprising the combination with an implement proper, having a handle receiving member projecting therefrom with hook receiving openings in one side thereof, of a foot rest including a body adapted for engagement upon the upper edge of the implement, parallel depending members carried by the body and adapted for engagement upon opposite sides of the implement, a bolt engaged through said depending members and through the implement to secure the body in position, and upwardly projecting hooks carried by said body and engaged in said openings above the edge of the implement.

In testimony whereof I hereunto affix my signature in the presence of two witnesses.

JOHN F. REEDER.

Witnesses:
W. E. Lowe,
J. C. Willard.

---

Copies of this patent may be obtained for five cents each, by addressing the "Commissioner of Patents, Washington, D. C."